(12) United States Patent
Meissner et al.

(10) Patent No.: US 11,818,435 B2
(45) Date of Patent: Nov. 14, 2023

(54) GENERATING VIDEO ON DEMAND (VOD) USING NETWORK DIGITAL VIDEO RECORDING (NDVR)

(71) Applicant: Charter Communications Operating, LLC, St. Louis, MO (US)

(72) Inventors: Jeremy Meissner, Parker, CO (US); Kiran Ganuthula, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/386,673

(22) Filed: Jul. 28, 2021

(65) Prior Publication Data

US 2023/0034931 A1 Feb. 2, 2023

(51) Int. Cl.
| | |
|---|---|
| *H04N 7/173* | (2011.01) |
| *H04N 21/472* | (2011.01) |
| *H04N 21/443* | (2011.01) |
| *H04N 21/462* | (2011.01) |
| *H04N 21/431* | (2011.01) |
| *H04L 65/612* | (2022.01) |

(52) U.S. Cl.
CPC ..... *H04N 21/47202* (2013.01); *H04L 65/612* (2022.05); *H04N 21/4314* (2013.01); *H04N 21/4431* (2013.01); *H04N 21/4621* (2013.01); *H04N 21/47217* (2013.01)

(58) Field of Classification Search
CPC ......... H04N 21/47202; H04N 21/4314; H04N 21/4431; H04N 21/4621; H04N 21/47217
See application file for complete search history.

(56) References Cited

U.S. PATENT DOCUMENTS

| | | | | |
|---|---|---|---|---|
| 2004/0255335 | A1* | 12/2004 | Fickle | H04L 65/765 725/135 |
| 2011/0157463 | A1* | 6/2011 | Shin | H04N 21/4316 348/E7.018 |
| 2016/0066009 | A1* | 3/2016 | Rothschild | H04N 21/2347 725/88 |
| 2016/0234551 | A1* | 8/2016 | Allegretti | H04N 21/854 |
| 2017/0155948 | A1* | 6/2017 | Harper | H04N 21/435 |
| 2017/0245015 | A1* | 8/2017 | Rose | H04N 21/47202 |

(Continued)

FOREIGN PATENT DOCUMENTS

CN 101196916 A * 6/2008

*Primary Examiner* — Gigi L Dubasky
(74) *Attorney, Agent, or Firm* — Dority & Manning, P.A.

(57) ABSTRACT

Disclosed herein are embodiments generating video on demand (VOD) using network digital video recording (NDVR). A method includes receiving a video on demand (VOD) request for generating a VOD package of a video broadcast prior to a broadcast. The method further includes retrieving electronic program guide (EPG) metadata related to the video broadcast. The method further includes sending a digital video recording (DVR) request to a network digital video recording (NDVR) system to record the video broadcast. The method further includes obtaining a video recording of the video broadcast generated by the NDVR system. The method further includes generating a VOD package of the video broadcast, the VOD package including the video recording, and VOD metadata of the video recording. The method further includes sending the VOD package of the video broadcast toward a VOD system to distribute the VOD package.

18 Claims, 4 Drawing Sheets

(56) References Cited

U.S. PATENT DOCUMENTS

| | | | |
|---|---|---|---|
| 2018/0014050 A1* | 1/2018 | Phillips | H04N 21/26258 |
| 2018/0025233 A1* | 1/2018 | Iwai | G06V 40/20 |
| | | | 348/143 |
| 2018/0192079 A1* | 7/2018 | Riedl | H04N 21/812 |
| 2018/0192106 A1* | 7/2018 | Loheide | H04N 21/262 |
| 2022/0201351 A1* | 6/2022 | Chung | H04N 21/4147 |

* cited by examiner

GENERATING VIDEO ON DEMAND (VOD) USING NETWORK DIGITAL VIDEO RECORDING (NDVR)

BACKGROUND

After initial airing of a video broadcast, such as a TV episode or a movie, the video broadcast is prepared for video on demand. This may require the programmer, such as NBC, CBS, ABC, or the like, to transmit the program to a third party to prepare a video on demand (VOD) package. The VOD package is then transmitted to a VOD system. This process may be time-consuming and result in delays in making the VOD package available to end users.

SUMMARY

The embodiments disclosed herein provide generating video on demand (VOD) using network digital video recording (NDVR). In particular, the embodiments provide a computing system that receives a VOD request for generating a VOD package of a video broadcast prior to a broadcast. The computing system retrieves electronic program guide (EPG) metadata and then sends a digital video recording (DVR) request to an NDVR system to record the video broadcast. After the broadcast, the computing system obtains a video recording of the video broadcast generated by the NDVR system. The computing system generates a VOD package based on the video record and sends the VOD package toward a VOD system for distribution to users. In this way, the VOD system reduces delays in providing the VOD package to users.

In one embodiment, a method is provided. The method includes receiving, by a computing system comprising one or more processor devices, a video on demand (VOD) request for generating a VOD package of a video broadcast prior to a broadcast. The method further includes retrieving, by the computing system, electronic program guide (EPG) metadata related to the video broadcast. The method further includes sending, by the computing system, a digital video recording (DVR) request to a network digital video recording (NDVR) system to record the video broadcast. The method further includes obtaining, by the computing system, a video recording of the video broadcast generated by the NDVR system after the broadcast. The method further includes generating, by the computing system, a VOD package of the video broadcast, the VOD package including the video recording, and VOD metadata of the video recording. The method further includes sending, by the computing system, the VOD package of the video broadcast toward a VOD system to distribute the VOD package.

In another embodiment, a computer system is provided. The computer system includes one or more processor devices of one or more computing devices. The one or more processor devices are configured to receive a video on demand (VOD) request for generating a VOD package of a video broadcast prior to a broadcast. The one or more processor devices are further configured to retrieve electronic program guide (EPG) metadata related to the video broadcast. The one or more processor devices are further configured to send a digital video recording (DVR) request to a network digital video recording (NDVR) system to record the video broadcast. The one or more processor devices are further configured to obtain a video recording of the video broadcast generated by the NDVR system after the broadcast. The one or more processor devices are further configured to generate a VOD package of the video broadcast, the VOD package including the video recording and VOD metadata of the video recording. The one or more processor devices are further configured to send the VOD package of the video broadcast toward a VOD system to distribute the VOD package.

In another embodiment, a computer program product includes a non-transitory computer-readable storage medium and includes instructions to cause one or more processor devices to receive a video on demand (VOD) request for generating a VOD package of a video broadcast prior to a broadcast. The one or more processor devices are further configured to retrieve electronic program guide (EPG) metadata related to the video broadcast. The one or more processor devices are further configured to send a digital video recording (DVR) request to a network digital video recording (NDVR) system to record the video broadcast. The one or more processor devices are further configured to obtain a video recording of the video broadcast generated by the NDVR system after the broadcast. The one or more processor devices are further configured to generate a VOD package of the video broadcast, the VOD package including the video recording and VOD metadata of the video recording. The one or more processor devices are further configured to send the VOD package of the video broadcast toward a VOD system to distribute the VOD package.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

After initial airing of a video broadcast, such as a TV episode or a movie, the video broadcast is prepared for video on demand (VOD). This may require the programmer, such as NBC, CBS, ABC, or the like, to transmit the program to a third party to prepare a video on demand (VOD) package. The VOD package is then transmitted to a VOD system. This process may be time-consuming and result in delays in making the VOD package available to end users.

The examples disclosed herein provide generating video on demand (VOD) using network digital video recording (NDVR). In particular, the embodiments provide a computing system that receives a VOD request for generating a VOD package of a video broadcast prior to a broadcast. The computing system retrieves electronic program guide (EPG) metadata and then sends a digital video recording (DVR) request to an NDVR system to record the video broadcast. After broadcast, the computing system receives from the NDVR system a DVR video recording, which may be a plurality of video segments. The computing system generates a VOD package based on the plurality of video segments and sends the VOD package toward a VOD system for distribution. In this way, the VOD system reduces delays in providing the VOD package to users.

Figure 1:
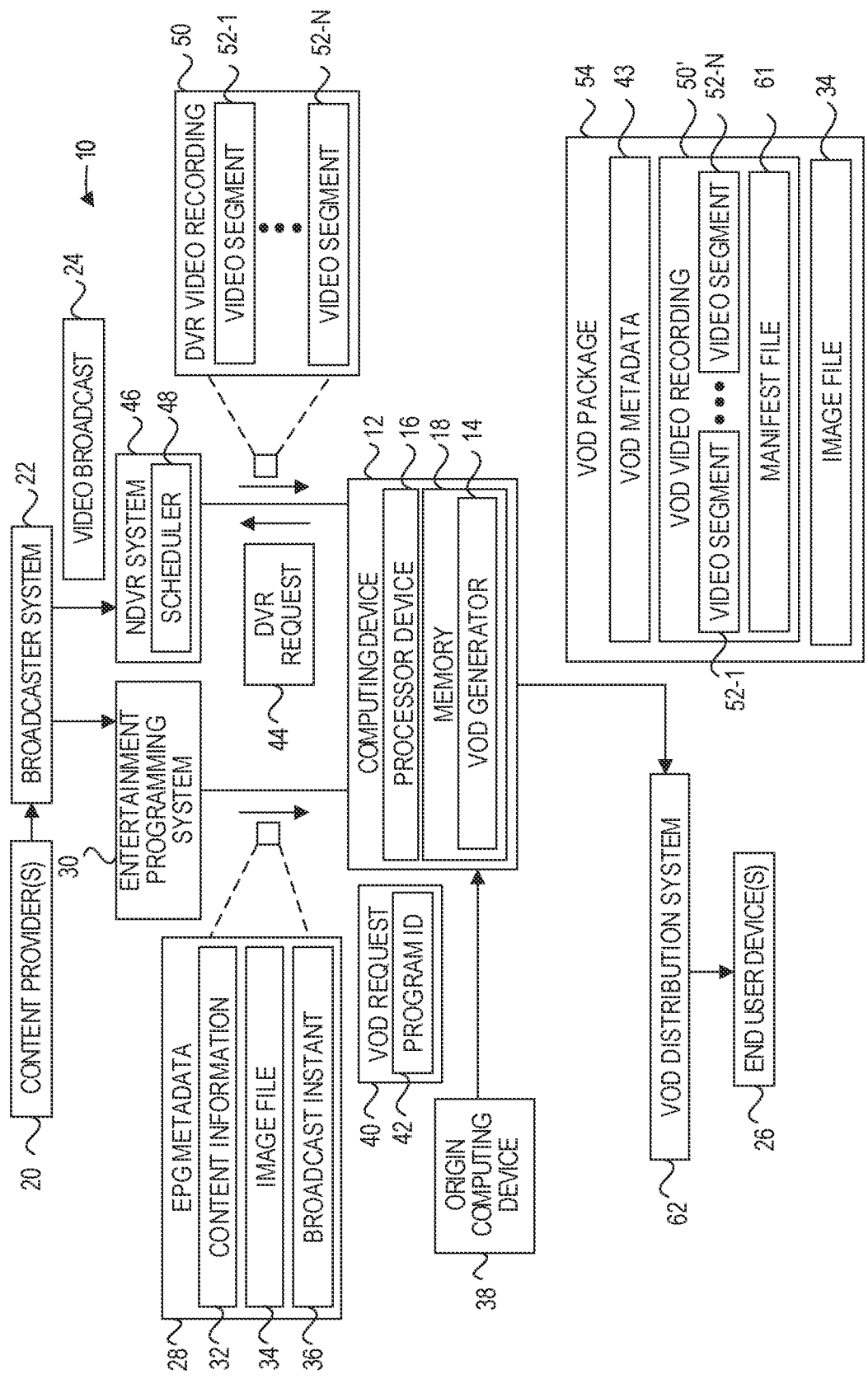
FIG. 1 is a block diagram of a system for generating video on demand (VOD) using network digital video recording (NDVR), illustrating certain aspects of various embodiments disclosed herein.

FIG. 1 is a block diagram of a system for generating VOD using NDVR, illustrating certain aspects of various embodiments disclosed herein. The system 10 includes a computing device 12, including a VOD generator 14, a processor device 16, and a memory 18 coupled to the processor device 16. Although only the VOD generator 14 is illustrated with a processor device 16 and a memory 18, any component may include a processor device 16 (or processor device set) and/or a memory 18 (or memory set).

Because the VOD generator 14 is a component of the computing device 12, functionality implemented by the VOD generator 14 may be attributed to the computing device 12 generally. Moreover, in examples where the VOD generator 14 comprises software instructions that program the processor device 16 to carry out functionality discussed herein, functionality implemented by the VOD generator 14 may be attributed herein to the processor device 16.

It is further noted that while the VOD generator 14 is shown as a single component, in other implementations, the VOD generator 14 may be implemented in a plurality of components. Finally, it is noted that while, for purposes of illustration and simplicity, the embodiments are illustrated as being implemented by a single processor device on a single computing device, in other environments, such as a distributed and/or clustered environment, and where the VOD generator 14 is implemented in multiple components, the VOD generator 14 may be implemented on a computer system that includes a plurality of processor devices of a plurality of different computing devices. Thus, irrespective of the implementation, the embodiments may be implemented on a computer system that includes one or more processor devices of one or more computing devices.

The computing system 10 includes one or more content provider(s) 20, which provide video content to a broadcaster system 22. The broadcaster system 22 is configured to transmit the video content as a video broadcast 24 to one or more end user devices 26 of one or more end users. For example, the broadcaster system 22 may include over the air transmission, cable transmission, IPTV (Internet Protocol Television), DTH (direct to home), DTT (digital terrestrial television), OTT (over the top) streaming, MVPD (multichannel video programming distributor), or the like. The video broadcast 24 may be an episode of a television series, an episode of a mini-series, a movie, or the like.

The broadcaster system 22 may transmit EPG metadata 28 or other broadcast information to an entertainment programming system 30 (may also be referred to as an Electronic Programming Guide (EPG)), such as Gracenote. The entertainment programming system 30 provides entertainment metadata, which may be directed to music, video, and sports, or the like. Entertainment metadata may include EPG metadata 28, which may also be referred to as an interactive programming guide (IPG) metadata. EPG metadata 28 provides users of television, radio, and other media applications with continuously updated menus providing scheduling information for current and upcoming broadcast programming. EPG metadata 28 is directed to the video broadcast 24 and provides information and data relevant thereto. For example, EPG metadata 28 may include content information 32, an image file 34, and/or a broadcast instant 36 (may also be referred to as a broadcast instance). The content information 32 may include the title, description, cast list, or the like. For example, content information 32 for a movie may include the title, logline, lead actors, genre, or the like. The image file 34 provides a visual image associated with the video broadcast 24. For example, for a movie, the image file 34 may include a movie poster. The broadcast instant 36 provides the date and/or time that the video broadcast 24 will initially broadcast.

An origin computing device 38 sends a VOD request 40 with a program ID 42 that uniquely identifies a video broadcast 24 that has not yet been previously broadcast and is not yet available through video on demand (VOD). In certain embodiments, the program ID 42 includes a TMS ID, which may also be referred to as Gracenote IDs. TMS IDs are standard identification for cross-platform linking and advanced search and discovery across video content. TMS IDs facilitate video discovery platforms and on-screen guides, enabling linking to schedule data and on-demand catalogs.

The VOD generator 14 receives the VOD request 40 and retrieves the EPG metadata 28 from the entertainment programming system 30. In certain embodiments, the VOD generator 14 determines whether the VOD request 40 is for a future, current, or past broadcast. If the VOD request 40 is for a past broadcast or a current broadcast, the VOD generator 14 rejects the VOD request 40. In certain embodiments, if the VOD request 40 is for a current broadcast, the VOD generator 14 informs the origin computing device 38 that the VOD request 40 may only be partially fulfilled.

If the VOD request 40 is for a future broadcast, the VOD generator 14 proceeds to generate VOD metadata 43 based on the EPG metadata 28 received from the entertainment programming system 30. The VOD metadata 43 may include, for example, the title, index of scenes, and/or business rules as to display, copy, or sale of the video broadcast 24 or the like. The VOD metadata 43 may include an Asset Distribution Interface (ADI) file and/or Extensible Markup Language (XML) file. An asset is a combination of content, which is a physical media file combined with the necessary metadata required to use the content for a given application. A package is a bundle of assets delivered, tracked, and managed as a unit for distribution and hand-off. ADI is used to define distribution of assets over a network interface, where assets are contained in a package that is moved from an Asset Distribution System (ADS) to an Asset Management System (AMS). Further, ADI is used to provide block updates to previously distributed assets. For example, block updates may include metadata replacement, content replacement, adding a new child asset, and/or deleting an asset, or the like. XML may be used so that parsing routines may be as simple as possible. This also allows for easy extensions with respect to new metadata tag-value pairs. XML is a markup language that defines a set of rules for encoding documents in a format that is human-readable and machine-readable.

The VOD generator 14 sends a DVR request 44 to a network digital video recording (NDVR) system 46. In certain embodiments, the NDVR system 46 includes a Cisco Virtual Media Recorder. The DVR request 44 requests that the NDVR system 46 records the video broadcast 24. In certain embodiments, the DVR request 44 includes an Application Programming Interface (API) call. The NDVR system 46 may be a cloud-based system that services recording requests from a plurality of users. In particular, the NDVR system 46 saves video broadcasts 24 to a service provider's data center rather than on a local computing device of the user, such as a personal DVR, set-top box, or the like. Local DVRs typically have a simultaneous recording limit with a local storage limit. The NDVR system 46 has a much larger simultaneous recording limit with a much larger storage limit. Accordingly, the NDVR system 46 is in communication with and receives recording requests from a plurality of users. The NDVR system 46 processes the DVR request 44 and uses a scheduler 48 to schedule recording of the video broadcast 24 at the time of the broadcast. In certain embodiments, the NDVR system 46 is unable to differentiate the DVR request 44 of the VOD generator 14 from any other user. In other embodiments, the NDVR system 46 is able to differentiate the DVR request 44 of the VOD generator 14 and prioritizes the DVR request 44 of the VOD generator 14 over that of other users.

In certain embodiments, at least some of the EPG metadata 28 may be obtained from the NDVR system 46 instead of from the entertainment programming system 30. In particular, the VOD generator 14 may receive the VOD request 40 with the program ID 42 and forward the VOD request 40 with the program ID 42 to the NDVR system 46. The NDVR system 46 can then retrieve EPG metadata 28 from the entertainment programming system 30 and forward at least a portion of the EPG metadata 28 to the VOD generator 14.

When the video broadcast 24 is broadcast, the NDVR system 46 generates a DVR video recording 50 based on the video broadcast 24; thus, the NDVR system 46 records the video broadcast 24. In certain embodiments, the DVR video recording 50 may be recorded in a plurality of video segments 52-1-52-N (may be referred to in general as video segments 52). For example, each video segment 52 may be less than 2 MB, less than 1 MB, or the like. In certain embodiments, the DVR video recording 50 may include at least 500 video segments 52, at least 1,000 video segments 52, or the like.

In certain embodiments, the DVR video recording 50 and/or the video segments 52 are recorded as a Video Transport Stream (TS) file, such as an H.264 Dynamic Adaptive Streaming over HTTP (DASH) Video Transport Stream (TS) file. A TS file is a video stream file used to store streamed or broadcast video. TS files are often saved as multiple files. DASH may also be referred to as MPEG-DASH and is an adaptive bitrate streaming technique enabling high-quality streaming of media content over the Internet delivered from conventional HTTP web servers. DASH breaks content into a sequence of small segments, which are served over HTTP, where each segment contains a short interval of playback time of content that is potentially hours in duration. H.264 is a video compression standard based on block-oriented, motion-compensated integer-DCT coding. H.264 is commonly used for recording, compression, and distribution of video content, supporting resolutions up to and including 8K UHD.

After or during the broadcast, the DVR video recording 50 is transmitted to the VOD generator 14. In certain embodiments, the VOD generator 14 pulls the DVR video recording 50 from the NDVR system 46. In other embodiments, the NDVR system 46 pushes the DVR video recording 50 to the VOD generator 14. In certain embodiments, the NDVR system 46 notifies the VOD generator 14 as to completion of the DVR video recording 50 and identification as to the location where the DVR video recording 50 is stored. For example, in certain embodiments, the NDVR system 46 sends an internal Uniform Resource Identifier (URI) for the VOD generator 14 to locate the DVR video recording 50. In this way, the VOD generator 14 can obtain the DVR video recording 50 without encryption. In particular, in certain embodiments, the DVR video recording 50 is obtained by obtaining a plurality of video segments 52.

Upon receiving the DVR video recording 50, the VOD generator 14 matches the DVR video recording 50 with VOD metadata 43, which may be previously prepared. As noted above, the VOD metadata 43 may be based on EPG metadata 28 received from the entertainment programming system 30.

The VOD generator 14 processes the DVR video recording 50 to generate a VOD video recording 50'. Further, the VOD generator 14 generates a VOD package 54, including the VOD video recording 50'. As noted above, an asset is a combination of content, which is a physical media file combined with the necessary metadata required to use the content for a given application. A package is a bundle of assets delivered, tracked, and managed as a unit for distribution and hand-off. In certain embodiments, the VOD generator 14 may remove commercial breaks within the DVR video recording 50. Further, the VOD generator 14 may transcode or encode the DVR video recording 50. In particular, the VOD generator 14 may translate the file format, the video, and/or the audio of the DVR video recording 50 to convert the DVR video recording 50 from one digital encoding to another.

In certain embodiments, if the DVR video recording 50 includes a plurality of video segments 52, the VOD generator 14 obtains the plurality of video segments 52 and then catenates the video segments 52 into a single video file forming the VOD video recording 50'. In particular, the VOD generator 14 may catenate the plurality of video segments 52 of the video broadcast 24 to generate a VOD video recording 50'. In certain embodiments, the VOD video recording 50' may include catenated TS files forming a single video file. In particular, in certain embodiments, the VOD generator 14 receives H.264 DASH-TS files for the video segments 52 of the DVR video recording 50. The VOD generator 14 then processes the H.264 DASH-TS files to generate a single H.264 Constant Bit Rate (CBR) file for the VOD video recording 50'. Further, the VOD video recording 50' may include a manifest file 61, such as a Manifest.xml file. The manifest file 61 contains metadata for a group of accompanying files that are part of a set or coherent unit. In this case, the manifest file 61 contains metadata for the video segments 52.

In certain embodiments, the VOD video recording 50' and/or manifest file 61 form a Tape Archive (TAR) file or the like. A TAR file is used to package files together for backup or distribution purposes. A TAR file contains multiple files stored in an uncompressed format along with metadata about the archive. In certain embodiments, the VOD package 54 includes an H.264 CBR file. CBR files are video files encoded at a constant bit rate and can use various compression algorithms.

In certain embodiments, the VOD generator 14 generates a plurality of VOD packages 54. For example, the VOD generator 14 may generate a first VOD package 54, including a MPEG-2 file, and a second VOD package 54, including a MPEG-4 file.

The VOD generator 14 then transmits the VOD package 54 to a VOD distribution system 62 for distribution to a one or more end user devices 26 of one or more users. For example, the VOD distribution system 62 may include a content delivery network (CDN) using at least one of a ConvergeMedia Manager (CMM) or Multiscreen Delivery Management System (MDMS). CMM is an open platform for deploying VOD and other on-demand services. MDMS is a virtualized software platform that may provide video-on-demand workflow. In particular, MDMS may provide additional benefits such as offline transcoding, content management, VOD storage, or the like. The VOD distribution system 62 may include a Video Storage and Processing Platform (VSPP), which allows for the storage and stream out of VOD video files.

In certain embodiments, the VOD distribution system 62 includes Mystro Back Office (MBO) to support MPEG-4 video and other end-user devices. The VOD distribution system 62 may include Spectrum TV App (STVA). Further, the VOD distribution system 62 may include vault storage, among other services.

The above features and configurations reduce delays between the broadcast and the availability of a VOD package 54 by a VOD distribution system 62.

Figure 2:
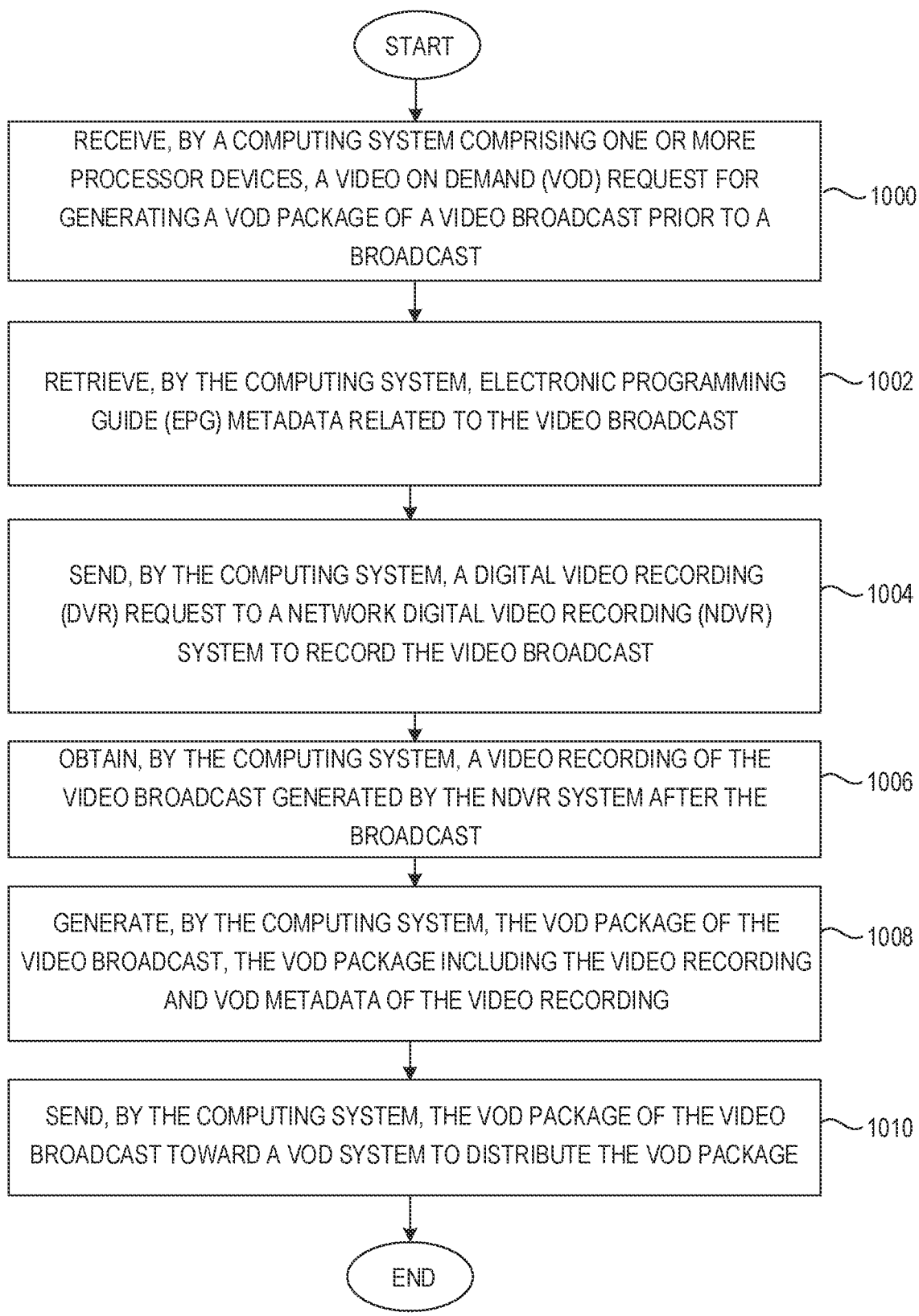
FIG. 2 is a flowchart illustrating processing steps for generating VOD using NDVR.

FIG. 2 is a flowchart illustrating processing steps using the system of FIG. 1. The computing system 10 comprising one or more processor devices 16 receives a video on demand (VOD) request 40 for generating a VOD package 54 of a video broadcast 24 prior to a broadcast (1000). The computing system 10 retrieves EPG metadata 28 related to the video broadcast 24, the EPG metadata 28 including a broadcast instant 36 (1002). The computing system 10 sends a digital video recording (DVR) request 44 to a network digital video recording (NDVR) system 46 to record the video broadcast 24 (1004). The computing system 10 obtains a video recording of the video broadcast 24 generated by the NDVR system 46 after the broadcast (1006). The computing system 10 generates a VOD package 54 of the video broadcast 24, the VOD package 54 including the video recording and VOD metadata 43 of the video recording (1008). The computing system 10 sends the VOD package 54 of the video broadcast 24 toward a VOD system to distribute the VOD package 54 (1010).

Figure 3:
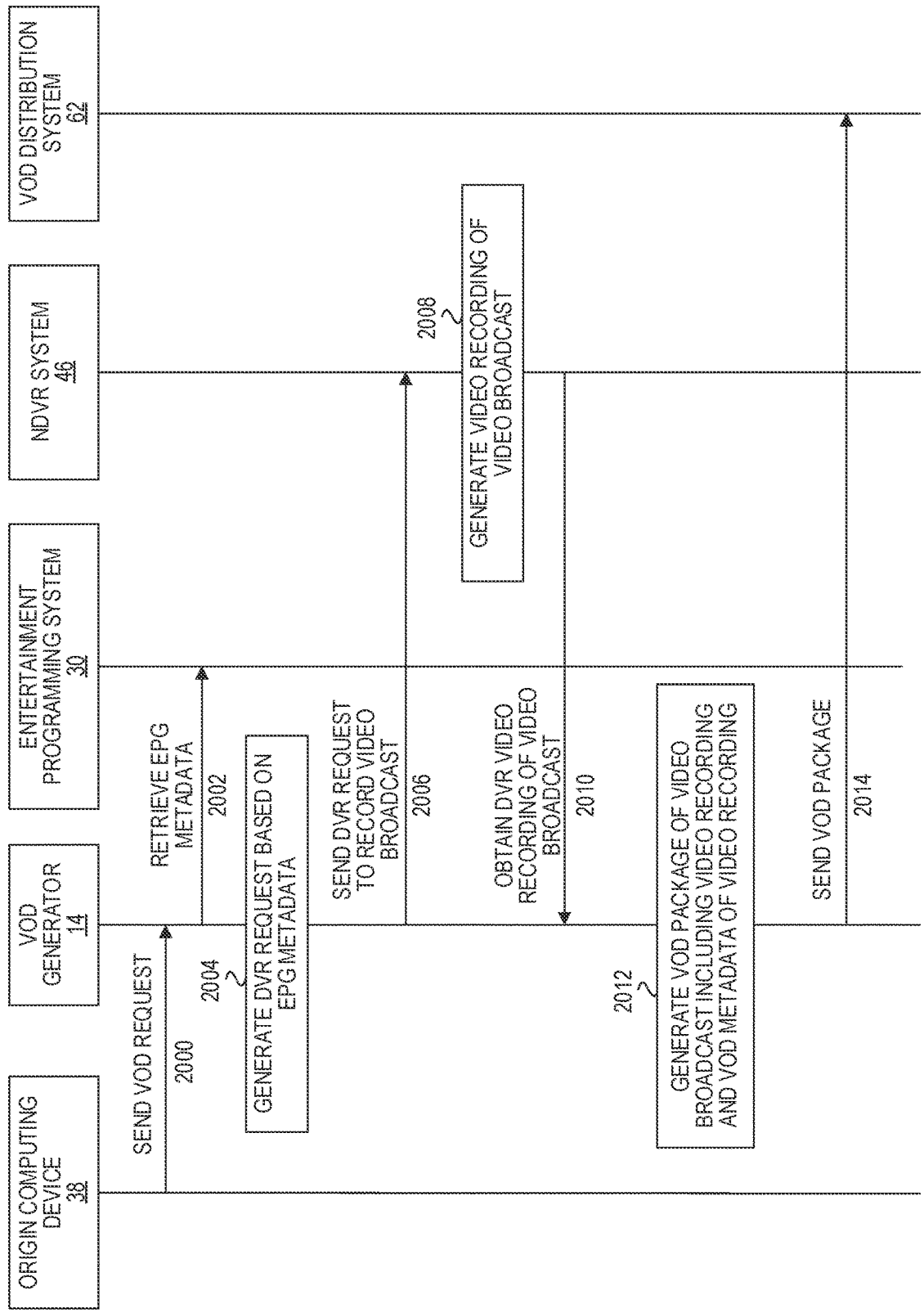
FIG. 3 is a message sequence diagram illustrating example messages communicated between and actions taken by several of the elements illustrated in FIG. 1, according to one embodiment.

FIG. 3 is a message sequence diagram illustrating example messages communicated between and actions taken by several of the elements illustrated in FIG. 1, according to one embodiment. The origin computing device 38 sends a VOD request 40 to a VOD generator 14 (2000). The VOD generator 14 retrieves EPG metadata 28 from the entertainment programming system 30 (2002). The VOD generator 14 generates a DVR request 44 based on the EPG metadata 28 (2004). The VOD generator 14 sends the DVR request 44 to record the video broadcast 24 to an NDVR system 46 (2006). The NDVR system 46 generates a DVR video recording 50 of the video broadcast 24 (2008). The VOD generator 14 obtains the DVR video recording 50 from the NDVR system 46 (2010). The VOD generator 14 generates a VOD package 54 of the video broadcast 24 including the VOD video recording 50' and VOD metadata 43 of the VOD video recording 50' (2012). The VOD generator 14 sends the VOD package 54 to the VOD distribution system 62 (2014).

Figure 4:
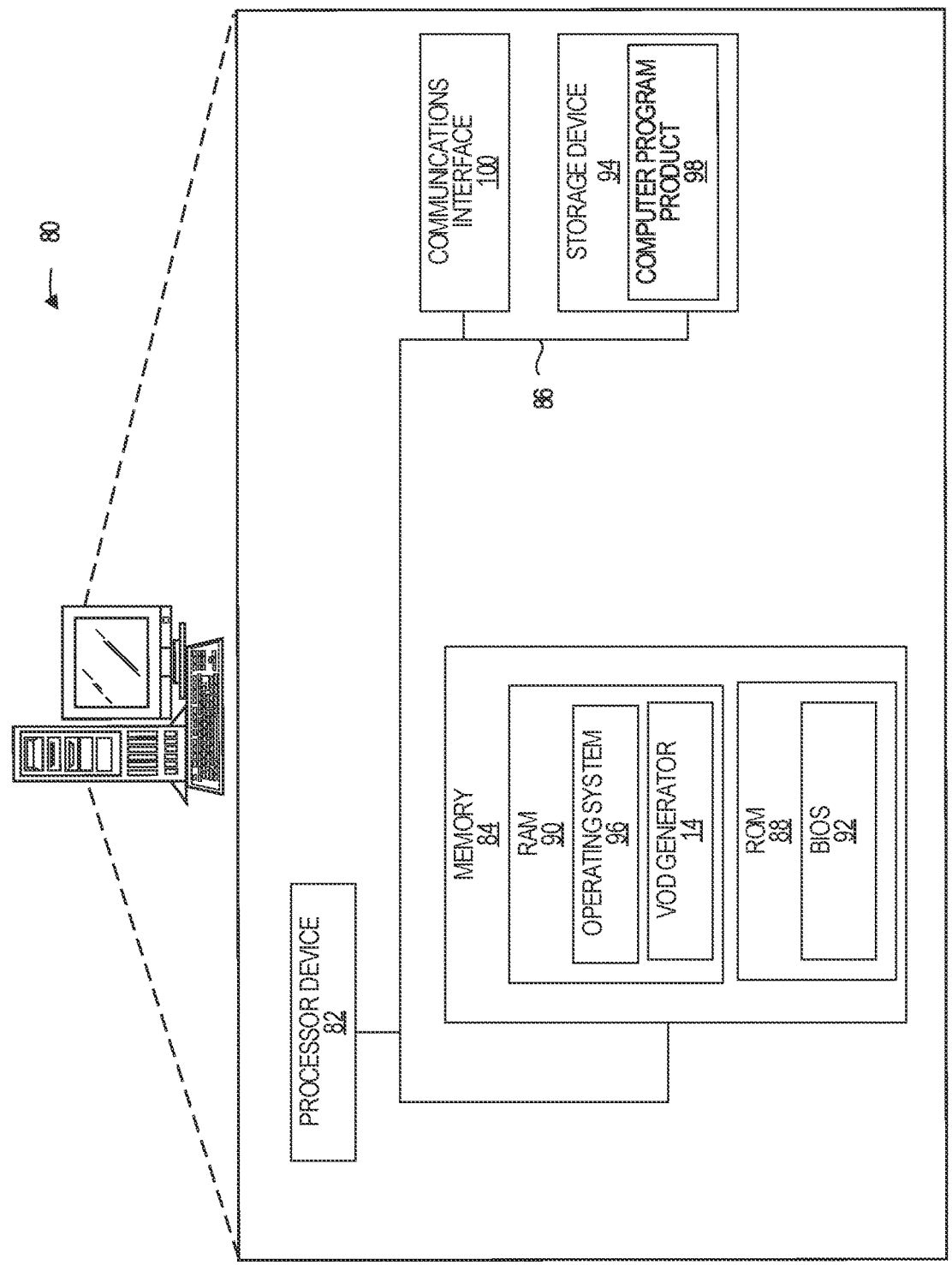
FIG. 4 is a block diagram of a computing device suitable for implementing one or more of the processing devices disclosed herein, according to one embodiment.

FIG. 4 is a block diagram of a computing device 80 containing components suitable for implementing any of the processing devices disclosed herein. The computing device 80 includes a processor device 82, a system memory 84, and a system bus 86. The system bus 86 provides an interface for system components including, but not limited to, the system memory 84 and the processor device 82. The processor device 82 can be any commercially available or proprietary processor.

The system bus 86 may be any of several types of bus structures that may further interconnect to a memory bus (with or without a memory controller), a peripheral bus, and/or a local bus using any of a variety of commercially available bus architectures. The system memory 84 may include non-volatile memory 88 (e.g., read-only memory (ROM), erasable programmable read-only memory (EPROM), electrically erasable programmable read-only memory (EEPROM), etc.), and volatile memory 90 (e.g., random-access memory (RAM)). A basic input/output system (BIOS) 92 may be stored in the non-volatile memory 88 and can include the basic routines that help transfer information between elements within the computing device 80. The volatile memory 90 may also include a high-speed RAM, such as static RAM, for caching data.

The computing device 80 may further include or be coupled to a non-transitory computer-readable storage medium such as a storage device 94, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 94 and other drives associated with computer-readable media and computer-usable media may provide non-volatile storage of data, data structures, computer-executable instructions, and the like.

A number of modules can be stored in the storage device 94 and in the volatile memory 90, including an operating system 96 and one or more program modules, which may implement the functionality described herein in whole or in part. All or a portion of the examples may be implemented as a computer program product 98 stored on a transitory or non-transitory computer-usable or computer-readable storage medium, such as the storage device 94, which includes complex programming instructions, such as complex computer-readable program code, to cause the processor device 82 to carry out the steps described herein. Thus, the computer-readable program code can comprise software instructions for implementing the functionality of the examples described herein when executed on the processor device 82. The processor device 82, in conjunction with the network manager in the volatile memory 90, may serve as a controller or control system for the computing device 80 that is to implement the functionality described herein.

The computing device 80 may also include one or more communication interfaces 100, depending on the particular functionality of the computing device 80. The communication interfaces 100 may comprise one or more wired Ethernet transceivers, wireless transceivers, fiber, satellite, and/or coaxial interfaces by way of non-limiting examples.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    receiving, by a computing system comprising one or more processor devices, a video on demand (VOD) request for generating a VOD package of a video broadcast prior to a broadcast;
    retrieving, by the computing system, electronic programming guide (EPG) metadata related to the video broadcast;
    sending, by the computing system, a digital video recording (DVR) request to a network digital video recording (NDVR) system to record the video broadcast;
    receiving, by the computing system from the NDVR system, a notification that a video recording of the video broadcast generated by the NDVR system is complete, the video recording generated by the NDVR system recording the broadcast, the notification comprising an internal Uniform Resource Identifier (URI) of a storage location of the video recording;
    obtaining after the broadcast, by the computing system, the video recording, the video recording comprising a plurality of video segments;
    matching, by the computing system, the video recording with VOD metadata generated based on the EPG metadata;
    catenating, by the computing system, the plurality of video segments to generate a single video file;
    generating, by the computing system, the VOD package of the video broadcast, the VOD package including the single video file and the VOD metadata; and
    sending, by the computing system, the VOD package of the video broadcast toward a VOD system to distribute the VOD package.

2. The method of claim 1, wherein receiving, by the computing system, the VOD request comprises receiving the VOD request comprises a program identification (ID) uniquely identifying the video broadcast.

3. The method of claim 2, wherein the program ID comprises a standard identification.

4. The method of claim 1, wherein the video broadcast comprises a television episode or a movie.

5. The method of claim 1, wherein the EPG metadata includes a broadcast instant.

6. The method of claim 1, wherein the EPG metadata includes an image file associated with the video broadcast.

7. The method of claim 1, further comprising generating, by the computing system, an Asset Distribution Interface (ADI) Extensible Markup Language (XML) file based on the EPG metadata.

8. The method of claim 1, wherein sending, by the computing system, the DVR request to the NDVR system, further comprises sending the DVR request to an Application Programming Interface (API) of the NDVR system.

9. The method of claim 1, wherein obtaining, by the computing system, the video recording of the video broadcast generated by the NDVR system after the broadcast further comprises at least one of:
    pulling, by the computing system, the video recording from the NDVR system; or
    pushing, by the NDVR system, the video recording to the computing system.

10. The method of claim 1, wherein each of the plurality of video segments is less than 2 megabytes.

11. The method of claim 1, wherein the plurality of video segments comprises at least 500 video segments.

12. The method of claim 1, wherein the plurality of video segments comprises a Video Transport Stream (TS) file.

13. The method of claim 1, wherein the plurality of video segments comprises an H.264 Dynamic Adaptive Streaming over HTTP (DASH) Video Transport Stream (TS) file.

14. The method of claim 1, wherein generating, by the computing system, the VOD package of the video broadcast further comprises:
    generating an H.264 Constant Bit Rate (CBR) file and including the H.264 CBR file in the VOD package.

15. The method of claim 1, wherein generating, by the computing system, the VOD package of the video broadcast further comprises:
    generating a Tape Archive (TAR) file and including the TAR file in the VOD package.

16. The method of claim 1, wherein generating, by the computing system, the VOD package of the video broadcast further comprises:
    generating at least one of a MPEG-2 file or a MPEG-4 file and including the at least one of the MPEG-2 file or the MPEG-4 file in the VOD package.

17. A computing system comprising:
    one or more processor devices of one or more computing devices, the one or more processor devices configured to:
    receive a video on demand (VOD) request for generating a VOD package of a video broadcast prior to a broadcast;
    retrieve EPG metadata related to the video broadcast;
    send a digital video recording (DVR) request to a network digital video recording (NDVR) system to record the video broadcast;
    receive, from the NDVR system, a notification that a video recording of the video broadcast generated by the NDVR system is complete, the video recording generated by the NDVR system recording the broadcast, the notification comprising an internal Uniform Resource Identifier (URI) of a storage location of the video recording;
    obtain after the broadcast, the video recording, the video recording comprising a plurality of video segments;
    match the video recording with VOD metadata generated based on the EPG metadata;
    catenate the plurality of video segments to generate a single video file;
    generate the VOD package of the video broadcast, the VOD package including the single video file and the VOD metadata of the video recording; and
    send the VOD package of the video broadcast toward a VOD system to distribute the VOD package.

18. A computer program product comprising a non-transitory computer-readable storage medium and including instructions to cause one or more processor devices to:

receive a video on demand (VOD) request for generating a VOD package of a video broadcast prior to a broadcast;
retrieve EPG metadata related to the video broadcast;
send a digital video recording (DVR) request to a network digital video recording (NDVR) system to record the video broadcast;
receive, from the NDVR system, a notification that a video recording of the video broadcast generated by the NDVR system is complete, the video recording generated by the NDVR system recording the broadcast, the notification comprising an internal Uniform Resource Identifier (URI) of a storage location of the video recording;
obtain after the broadcast, the video recording, the video recording comprising a plurality of video segments;
match the video recording with VOD metadata generated based on the EPG metadata;
catenate the plurality of video segments to generate a single video file;
generate the VOD package of the video broadcast, the VOD package including the single video file and the VOD metadata of the video recording; and
send the VOD package of the video broadcast toward a VOD system to distribute the VOD package.

* * * * *